United States Patent

[11] 3,554,457

[72] Inventors Armin S. P. Hutzenlaub
 Gassenhagen;
 Paul Gerhard Winchenbach,
 Gummersbach, Germany
[21] Appl. No. 827,703
[22] Filed May 26, 1969
[45] Patented Jan. 12, 1971
[73] Assignee Erwin Kampf Machinenfabrik
 Muhlen, Germany

[54] WINDING SHAFT WITH PLURAL BOBBIN
 CARRYING RINGS
 9 Claims, 2 Drawing Figs.
[52] U.S. Cl.................................................. 242/56.9,
 308/189
[51] Int. Cl..................................................... B65h 19/04;
 F16c 13/04

[50] Field of Search.......................................... 242/56.9,
 68, 129.6, 46.2; 308/189, 190, 233; 28/33;
 135/101

[56] References Cited
 UNITED STATES PATENTS
 3,322,361 5/1967 Young......................... 242/56.9
 3,424,395 1/1969 Schmidt et al................ 242/67.1

Primary Examiner—George F. Mautz
Attorney—Bacon & Thomas

ABSTRACT: A plurality of carrier rings are concentrically spaced from a shaft and supported for independent rotation relative to each other by ball bearings between adjacent rings and the shaft. The rings are held against axial separation and each ring has a groove to receive an annular element for releasably locking a bobbin holder on each ring.

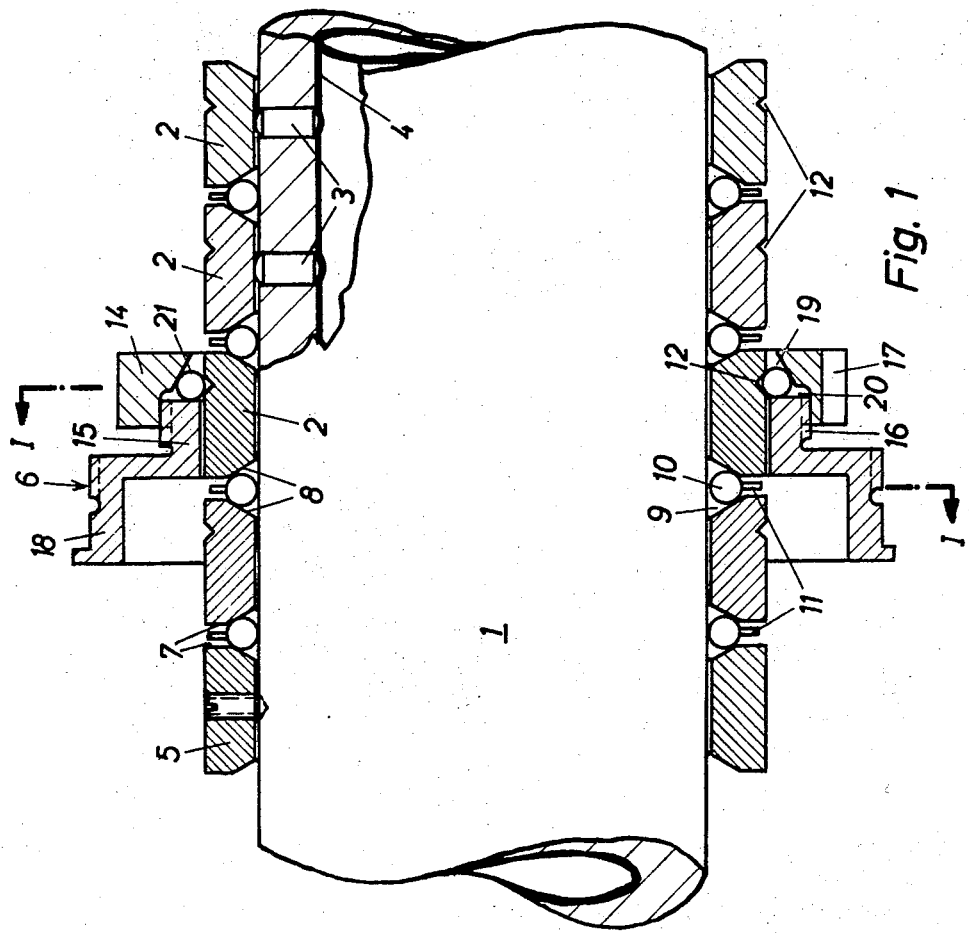
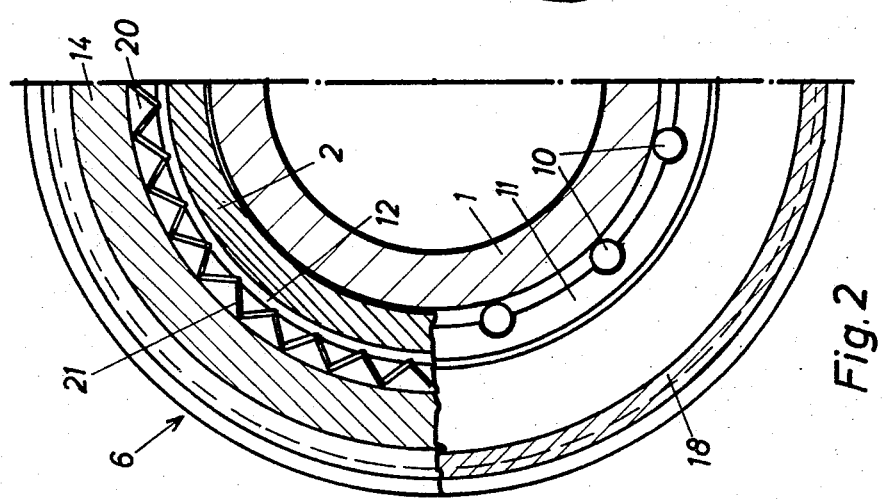

WINDING SHAFT WITH PLURAL BOBBIN CARRYING RINGS

This invention relates to a winding shaft comprising several friction driven carrier rings under initial tension in the axial direction which are arranged adjacent one another and each of which receives a winding tube or bobbin.

Winding shafts of the kind are used for simultaneously winding numerous individual laps cut from a common lap or web, into packages. To ensure that all the packages are equal in hardness or strength, the various winding tubes or bobbins must be driven independently of one another.

Numerous winding shafts of the kind referred to are known. The various carrier rings are driven by tightenable friction bolts arranged inside the winding shaft. Friction elements which enable adjacent carrier rings to slip relative to one another are arranged between the carrier rings in the axial direction. However, the influence which adjacent carrier rings have upon one another in this arrangement is still considerable so that not all the carrier rings and hence winding tubes or bobbins have the same winding torque. Another difficulty arises out of the fact that the tubes or bobbins have to be pushed onto and firmly secured to the carrier rings. To obviate this difficulty, radially tightenable carrier rings or separate locking elements have already been used. Arrangements such as these further the influence which adjacent carrier rings have on one another so that the objective of an equal winding torque for all the carrier rings is not achieved.

The object of the invention is to eliminate the influence which adjacent carrier rings exert on one another.

According to the invention, this object is achieved by virtue of the fact that the radial lateral surfaces of the rigid carrier rings have a conical surface in the vicinity of each inner edge, in addition to which a set of roller bearings is arranged between the conical surfaces of adjacent carrier rings extending like double cones relative to one another, and the periphery of the winding shaft.

The peripheral surface of the winding shaft and the conical surfaces of the rigid carrier rings are in the form of hardened bearing surfaces. The carrier rings have a radial clearance relative to the winding shaft and can be axially tightened.

By virtue of this arrangement, the carrier rings are supported and centered by ball bearings both relative to the winding shaft and relative to one another so that the carrier rings are mutually supported substantially free from friction. Initial compression of the carrier rings in the axial direction ensures that the bearings are uniformly loaded. It also ensures uniform centering. By virtue of this arrangement, each individual carrier ring is freely rotatable on the winding shaft independently of the adjacent carrier rings. In operation, the torque is transmitted from the winding shaft to the carrier rings in known manner by friction elements. However, adjacent carrier rings do not have any influence on one another so that each carrier ring is driven with an equal driving moment. The slip of each individual carrier ring is automatically adjusted solely in dependence upon the particular winding conditions independently of the adjacent carrier rings.

According to another aspect of the invention, the rigid carrier rings each enable a winding tube or bobbin to be fixed tightly onto them. For this purpose, each carrier ring is provided with an outer groove for receiving a retaining element for the associated bobbin or tube holder. The latter cooperates with a locking ring which engages over an outer thread on the holder. Between the holder and the locking ring there is an annular retaining element in the form of a pretensioned helical spring ring designed to withstand both tensile and compressive stress. In its relaxed state, the internal diameter of the helical spring ring is slightly larger than the outer diameter of the carrier rings so that when the tube or bobbin holders are put on, the helical spring ring can be pushed over the carrier rings. When the locking ring is screwed on over the holder, the helical spring ring is placed under tension in a groove so that it is forced into the outer groove in the corresponding carrier ring. In this way, the corresponding bobbin or tube holder is locked positively on to the corresponding carrier ring. The tube or bobbin itself is screwed to the holder in known manner.

The invention is described in the following with reference to a preferred embodiment. In the drawings, FIG. 1 is a longitudinal section through part of a winding shaft according to the invention, some of which has been cut away; and FIG. 2 is a half section on the line I–I of FIG. 1.

FIG. 1 shows a tubular winding shaft 1 in whose surface radially displaceable friction elements 3 are arranged in radial alignment with each carrier ring 2. Inside the winding shaft 1 there is an actuating system for the friction elements, preferably in the form of a pneumatically operable hose. Further details of the inside of the winding shaft have not been shown because they are known.

The peripheral surface of the winding shaft is in the form of a hardened bearing surface. The winding shaft 1 carries a locking ring 5 and a plurality of carrier rings 2 corresponding to the number of bobbin or tube holders 6 to be accommodated and hence to the number of packages to be formed. On the end opposite the locking ring 5, the carrier rings are held by another locking ring which is not shown in the drawings and which enables the carrier rings to be precompressed in the axial direction. As clearly shown in FIG. 1, the internal diameter of each carrier ring is greater than the outer diameter of the winding shaft 1 so that the carrier rings surround the winding shaft with clearance. The carrier rings 2 can be driven by the winding shaft 1 only through the friction elements 3. In the vicinity of each inner edge, the radial lateral surfaces 7 of the carrier rings have a conical surface 8. Accordingly, an annular groove 9 of triangular cross section is formed between adjacent carrier rings and the peripheral surface of the winding shaft. Inserted into each such annular groove there are ball bearings 10 held in a circular cage 11. The carrier rings preferably consist of steel, their outer surfaces being hardened.

The winding shaft according to the invention accommodates the carrier rings substantially free from friction on ball bearings, one set of ball bearings being allocated to two adjacent carrier rings. Once the arrangement has been axially secured in the requisite manner, the individual carrier rings are rotatable and centered completely independently of one another on the winding shaft. The torque is transmitted to the carrier rings in known manner through the friction elements 3 which are actuated by a corresponding actuating mechanism. An equal friction moment or slip moment is transmitted to each carrier ring so that the driving moment is the same for each winding tube or bobbin and hence for each package. As a result, all the packages are of equal strength. In operation, the slip of each carrier ring relative to the winding shaft and friction elements is automatically adjusted solely in dependence upon the conditions under which the particular package is being wound, i.e. the particular degree of slip is not affected by the adjacent carrier rings. Except for the friction elements, there is only roller friction between adjacent carrier rings and between carrier rings and winding shaft. The friction moment is transmitted solely through the friction elements 3 so that the friction moment only occurs at the places provided.

The rigid carrier rings 2 necessitate a special design for the mounting of the bobbin or tube holders 6. To this end, each carrier ring 2 has an annular outer groove 12. Each holder 6 is secured firmly to the associated carrier ring 2 by means of a locking ring 14 of substantially Z-shaped cross section. An inner ring 15 of the holder 6 has an outer thread 16 in which the locking ring 14 engages through an internal screw thread. Around its periphery, the locking ring 14 has several axial grooves 17 by which it can be actuated. An outer ring 18 of the holder 6 accommodates a bobbin or tube which is secured firmly to the holder in any way (not shown in the drawings). The inner surface of the locking ring 14 is in the form of a conical surface 19 so that a groove is formed between the end face 20 of the inner ring 15 and the conical surface 19. This groove accommodates a helical spring ring 21. The turns of the helical spring are prestretched as shown in FIG. 2, in particular, so that the helical spring ring can be stretched and compressed in the peripheral direction. When in its relaxed state, the internal diameter of the helical spring ring is somewhat larger than the outer diameter of the carrier rings 2, so that when the holder is put on, the helical spring ring 21 can be pushed over the carrier rings.

The bobbin or tube holders 6 are put on as follows: after the holder with the tube or bobbin has been pushed onto the corresponding carrier ring 2, the helical spring ring 21 is pushed over and the locking ring 14 screwed onto the outer thread 16 to force spring 21 radially inwardly into a groove 12. This establishes a positive connection between the bobbin or tube holder 6 and the corresponding carrier ring 2. All the holders 6 are thus mounted on the carrier rings 2. After the packages have been formed, the bobbin or tube holders are removed in the opposite order.

The initially untensioned helical spring ring passes freely over the carrier rings. It is held both in the peripheral groove 12 and in the groove 19 by tightening the locking ring.

We claim:
1. A winding shaft device comprising:
   a shaft;
   a plurality of adjacent but axially spaced carrier rings surrounding said shaft, adjacent ends of adjacent rings being conically recessed to define, with the surface of said shaft, triangular ball races between adjacent rings and said shaft;
   a set of ball bearings in each of said races; and
   means holding said rings and balls in axial compression whereby said balls hold said rings in concentric relation to said shaft and provide antifriction means between adjacent rings and between said rings and shaft.

2. A winding shaft device as defined in claim 1 wherein said conically recessed surfaces and the outer surface of said shaft are of hardened material to define hardened bearing surfaces.

3. A winding shaft device as defined in claim 1 wherein there is radial clearance between said shaft and rings.

4. A winding shaft device as defined in claim 1 including a circular cage for each of said sets of ball bearings.

5. A winding shaft device as defined in claim 1 wherein each carrier ring is provided with an outer peripheral groove for accommodating a retaining element for a bobbin holder.

6. A winding shaft device as defined in claim 5 including a bobbin holder on each ring, each bobbin holder including a locking ring over a corresponding groove, and a retaining element in said groove and held therein by said locking ring.

7. A winding shaft device as defined in claim 6 wherein said locking ring and an adjacent portion of said holder define an inwardly facing groove, said retaining element being annular and extending into said inwardly facing groove.

8. A winding shaft device as defined in claim 7 wherein said locking ring is threadedly adjustable on said holder, in an axial direction, and serves to radially contract said annular retaining element into said outer groove in said carrier ring.

9. A winding shaft as defined in claim 8 wherein said retaining element is in the form of a helical spring ring having a normal inner diameter greater than the outer diameter of its carrier ring.